United States Patent Office 2,877,237
Patented Mar. 10, 1959

2,877,237

3,17α-DIHYDROXY - 17 - ACETYL-$\Delta^{1,3,5(10)}$-ESTRATRIENE AND PROCESS OF PREPARING THE SAME Carl Djerassi, Birmingham, Mich., and George Rosenkranz, Mexico City, Mexico, assignors to Syntex S. A., Mexico City, Mexico, a corporation of Mexico No Drawing. Application August 12, 1955
Serial No. 528,129

7 Claims. (Cl. 260—397.4)

The present invention relates to novel cyclopentanophenanthrene compounds and to a novel process for preparing the same.

More particularly the present invention relates to a novel process for preparing steroid compounds having an aromatic ring A and an acetyl group at C–17 and to novel compounds so characterized. The novel compounds produced in accordance with the present invention are believed to have therapeutic value as well as being especially suitable as intermediates for the production of therapeutic compounds.

In the application of Martin Rubin, filed August 28, 1950, Serial No. 181,941, now abandoned, there is disclosed a process for the production of a 2,4,17-tribromo derivative of the readily available allopregnane-3,20-dione which on boiling with collidine affords $\Delta^{1,4,16}$-pregnatriene-3,20-dione. The application also disloses the pyrolysis of the latter compound in mineral oil to produce 3-hydroxy-17-acetyl-$\Delta^{1,3,5(10),16}$-estratetraene.

In accordance with the present invention it has been discovered that the aforementioned 3-hydroxy-17-acetyl-$\Delta^{1,3,5(10),16}$-estratetraene can be hydrogenated to produce 3-hydroxy-17-acetyl-$\Delta^{1,3,5(10)}$-estratriene, a steroid having a structure similar to some extent to both estrone and progesterone, and potentially capable of simplifying eventual total synthesis of cortisone.

It has further been discovered in accordance with the present invention that 3-hydroxy-17-acetyl-$\Delta^{1,3,5(10)}$-estratriene could be converted to a totally new compound, namely, 3,17α-dihydroxy-17-acetyl-$\Delta^{1,3,5(10)}$-estratriene a compound possessing an aromatic ring A and a structure at C–17 similar to the adrenal hormone 17α-hydroxyprogesterone.

The final product of the process of the present invention, i. e., the 3,17α-dehydroxy-17-acetyl-$\Delta^{1,3,5(10)}$-estratriene is a valuable intermediate for the production of the active cortical hormone 19-nor-17α-hydroxyprogesterone as set forth in copending application of Djerassi et al., Serial No. 425,310, filed April 23, 1954, now patent No. 2,781,365, granted February 12, 1957.

The process of the present invention may be exemplified by the following general equations:

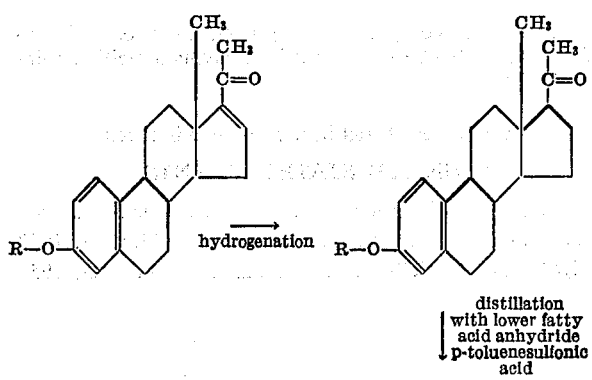

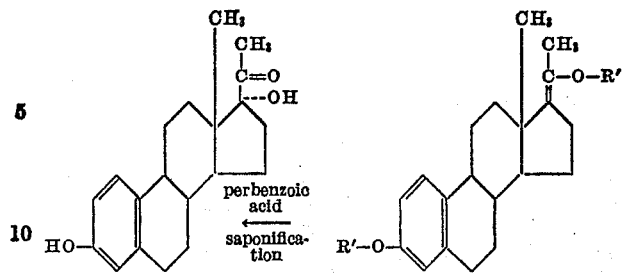

In the above equations, R may be hydrogen; a lower alkyl ether group such as methyl or ethyl ether; or an acyl group which is the residue of a lower fatty acid such as acetic or propionic acids or the residue of benzoic acid. $R^1$ may be the residue of a lower fatty acid such as acetic or propionic.

The process above outlined may be carried out generally by mildly hydrogenateing 3-hydroxy-17-acetyl-$\Delta^{1,3,5(10),16}$-estratetraene dissolved in a suitable solvent such as ethyl acetate in the presence of a hydrogenation catalyst such as a 5% palladium-on-charcoal as by shaking in a hydrogen atmosphere until no more hydrogen is taken up. Thereafter the reaction mixture was filtered and concentrated to produce colorless crystals of 3-hydroxy - 17 - acetyl - $\Delta^{1,3,5(10)}$ - estratriene. The impure products could be further purified by recrystallization from a suitable solvent such as ethyl acetate.

The enol acylate of 3-hydroxy-17-acetyl-$\Delta^{1,3,5(10)}$-estratriene was prepared by slow distillation of a mixture of 3 - hydroxy - 17 - acetyl - $\Delta^{1,3,5(10)}$ - estratriene, p-toluenesulfonic acid and a lower fatty acid anhydride such as acetic anhydride or propionic anhydride for a period of the order of five hours. Thereafter a small amount of pyridine and a suitable solvent such as ethyl ether was added and the solution filtered and washed with a suitable dilute base such as cold aqueous sodium hydroxide and water, dried and concentrated. The crystals were further purified by recrystallization from a suitable solvent such as a mixture of ether and hexane.

The enol acylate thus produced was then dissolved in a suitable solvent such as chloroform and allowed to stand at room temperature for a long period of time, as for example two days, with a chloroform solution of perbenzoic acid and then washed successively with an aqueous solution of sodium iodide, sodium thiosulfate, sodium carbonate and finally water. The residue then obtained after solvent evaporation was saponified by using a water-alcohol solution of a suitable base, such as a dilute solution of potassium hydroxide in a solvent consisting of a minor proportion of water and a major proportion of methanol. The product was neutralized with a weak acid such as acetic acid, concentrated and crystallized. The impure 3,17α-dihydroxy-17-acetyl-$\Delta^{1,3,5(10)}$-estratriene was then purified by recrystallization from a suitable solvent such as ethyl acetate. Lower fatty acid esters and benzoic esters of the phenol could then be prepared by heating the phenol with a suitable anhydride in the presence of pyridine.

The following specific examples serve to illustrate the present invention but are not intended to limit the same:

*Example I*

3-hydroxy-17-acetyl-$\Delta^{1,3,5(10)}$-estratriene. — A solution of 3.47 g. of 3-hydroxy-17-acetyl-$\Delta^{1,3,5(10),16}$-estratetraene in 160 cc. of ethyl acetate was shaken in an atmosphere of hydrogen with 0.5 g. of 5% palladium-on-charcoal catalyst until the gas up-take stopped. Filtration and concentration afforded 81–89% (four experiments) of colorless crystals with a melting point of 243–245° C. Further recrystallization from ethyl acetate raised the melting point to 247–249° C. $[\alpha]_D^{20}$ +159°, ultraviolet maximum at 280 m$\mu$ (log $\epsilon$ 3.40) and 222 m$\mu$ (log $\epsilon$ 3.82), and minimum at 248 m$\mu$ (log $\epsilon$ 2.27).

Example II

*Enol acetate of 3-acetoxy-17-acetyl-$\Delta^{1,3,5(10)}$-estratriene.*—A mixture of 4.0 g. of 3-hydroxy-17-acetyl-$\Delta^{1,3,5(10)}$-estratriene of Example I, 1.7 g. of p-toluenesulfonic acid and 250 cc. of acetic anhydride was concentrated to 25–30 cc. by slow distillation over a period of five hours. After addition of 0.5 cc. of pyridine and 100 cc. of ether, the solution was filtered and washed five times with ice-cold 1% sodium hydroxide solution and water, dried and concentrated. The crystals thus obtained (3.76 g.) were combined with a second crop isolated from the mother liquors by chromatography and recrystallized once from ether-hexane; yield, 4.14 g. (78%) with a melting point of 154–158° C., $[\alpha]_D^{20}$ +42°. The melting point range was not narrowed by further recrystallization.

*Analysis.*—Calculated for $C_{24}H_{30}O_4$: C, 75.36; H, 7.91. Found: C, 75.65; H, 8.10.

Example III

*3,17α-dihydroxy-17-acetyl-$\Delta^{1,3,5(10)}$-estratriene.*—A solution of 4.13 g. of the enol acetate of Example II in 100 cc. of chloroform was allowed to stand at room temperature for two days with 40 cc. of a chloroform solution of perbenzoic acid (0.066 g./cc.) and then washed successively with aqueous solutions of sodium iodide, sodium thiosulfate, sodium carbonate and finally water. The residue obtained on evaporation of the solvent was refluxed for fifteen minutes with 1.7 g. of potassium hydroxide, 12 cc. of water and 340 cc. of methanol. Neutralization with acetic acid followed by concentration gave three crops of crystals of nearly equal purity totalling 2.72 g. (80%) with a melting point of 234–240° C. Recrystallization from ethyl acetate afforded the analytical sample with a melting point of 240–242° C. (inserted at 225° C.), $[\alpha]_D^{20}$ +83.7° (dioxane), ultra violet maximum at 280 m$\mu$ (log $\epsilon$ 3.29) and minimum at 248 m$\mu$ (log $\epsilon$ 2.35).

*Analysis.*—Calculated for $C_{20}H_{26}O_3$: C, 76.40; H, 8.39. Found: C, 76.60; H, 8.59.

Example IV

The 3-monoacetate was obtained on heating the phenol of Example III with acetic anhydride-pyridine for one hour on the steambath; melting point 128–129° C., $[\alpha]_D^{20}$ +29.3°, +73.3 (dioxane) after recrystallization from hexane-acetone. The infrared spectrum showed the presence of a free hydroxyl group, phenolic acetate and non-conjugated 20-keto group (1709 cm.$^{-1}$).

*Analysis.*—Calculated for $C_{22}H_{28}O_4$: C, 74.13; H, 7.92. Found: C, 74.19; H, 7.94.

The present application is a continuation-in-part of application Serial No. 183,301, filed September 5, 1950, now abandoned.

We claim:

1. A process for the production of enol lower fatty acylates of 3-acyloxy-17-acetyl-$\Delta^{1,3,5(10)}$-estratriene having the following structural formula:

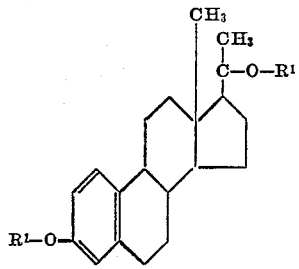

wherein $R^1$ is the residue of a lower fatty acid, comprising treating with hydrogen in the presence of a palladium catalyst 3-hydroxy-17-acetyl-$\Delta^{1,3,5(10),16}$-estratetraene to form 3-hydroxy-17-acetyl-$\Delta^{1,3,5(10)}$-estratriene and treating said triene with a lower fatty acid anhydride in the presence of p-toluenesulfonic acid.

2. A process for the production of 3,17α-dihydroxy-17-acetyl-$\Delta^{1,3,5(10)}$-estratriene which comprises treating with hydrogen in the presence of a palladium catalyst 3-hydroxy-17-acetyl-$\Delta^{1,3,5(10),16}$-estratetraene to form 3-hydroxy-17-acetyl-$\Delta^{1,3,5(10)}$-estratriene, treating said triene with a lower fatty acid anhydride in the presence of p-toluenesulfonic acid to form enol acylate of 3-acyloxy-17-acetyl-$\Delta^{1,3,5(10)}$-estratriene, and thereafter treating said enol acylate with perbenzoic acid followed by saponification with potassium hydroxide.

3. Enol lower fatty acylates of 3-acyloxy-17-acetyl-$\Delta^{1,3,5(10)}$-estratriene having the following structural formula:

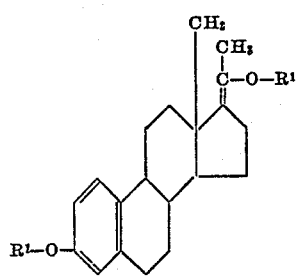

wherein $R^1$ is the residue of a lower fatty acid.

4. A new compound comprising the enol acetate of 3-acetoxy-17-acetyl-$\Delta^{1,3,5(10)}$-estratriene having a melting point of 154–158° C.

5. 17α - hydroxy - 17 - acetyl - $\Delta^{1,3,5(10)}$ - estratrienes having the following formula:

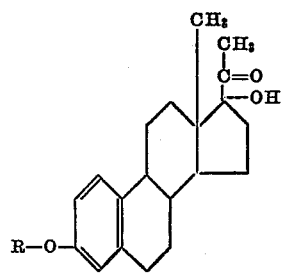

wherein R is selected from the group consisting of hydrogen, the residue of a lower fatty acid and the residue of benzoic acid.

6. A new compound comprising 3,17α-dihydroxy-17-acetyl-$\Delta^{1,3,5(10)}$-estratriene having a melting point of 240–242° C.

7. A new compound comprising 3-acetoxy-17α-hydroxy-17-acetyl-$\Delta^{1,3,5(10)}$-estratriene having a melting point of 128–129° C.

References Cited in the file of this patent

UNITED STATES PATENTS

| Number | Name | Date |
|---|---|---|
| 2,361,847 | Inhoffen | Oct. 31, 1944 |
| 2,598,652 | Velluz | May 27, 1952 |
| 2,700,674 | Velluz | Jan. 25, 1955 |